(12) United States Patent
Henry et al.

(10) Patent No.: US 10,194,579 B2
(45) Date of Patent: Feb. 5, 2019

(54) SECTIONAL CONTROL CALIBRATION SYSTEM AND METHOD

(71) Applicant: CNH Industrial Canada, Ltd., Saskatoon (CA)

(72) Inventors: James Wayne Henry, Saskatoon (CA); Joel John Octave Gervais, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 429 days.

(21) Appl. No.: 14/609,147

(22) Filed: Jan. 29, 2015

(65) Prior Publication Data

US 2016/0219781 A1 Aug. 4, 2016

(51) Int. Cl.
| | | |
|---|---|---|
| *A01C 7/10* | (2006.01) | |
| *A01C 17/00* | (2006.01) | |
| *B05B 12/00* | (2018.01) | |
| *A01C 23/00* | (2006.01) | |
| *A01C 23/04* | (2006.01) | |

(Continued)

(52) U.S. Cl.
CPC ............ *A01C 7/102* (2013.01); *A01C 7/081* (2013.01); *A01C 7/105* (2013.01); *A01C 7/107* (2013.01); *A01C 7/18* (2013.01); *A01C 7/205* (2013.01); *A01C 15/00* (2013.01); *A01C 17/006* (2013.01); *A01C 17/008* (2013.01); *A01C 23/00* (2013.01); *A01C 23/005* (2013.01); *A01C 23/007* (2013.01); *A01C 23/047* (2013.01);

(Continued)

(58) Field of Classification Search
CPC ......... A01C 7/102; A01C 7/105; A01C 7/107; A01C 7/18; A01C 15/00; A01C 17/006; A01C 17/008; A01C 7/081; A01C 23/00; A01C 23/005; A01C 23/007; A01C 7/205; A01C 23/047; G01G 11/08; G01G 19/08; A01G 25/165; A01M 7/0042; B05B 12/006; B05B 12/085
USPC .......................................................... 701/50
See application file for complete search history.

(56) References Cited

U.S. PATENT DOCUMENTS 4,122,974 A 10/1978 Harbert et al.
4,450,779 A 5/1984 Bailey
(Continued)

FOREIGN PATENT DOCUMENTS

EP 0309062 3/1989
WO 2008107454 9/2008

OTHER PUBLICATIONS

Precision Air Cart Pro 600/700 Quick Reference; Case Agricultural; caseihafs.com/uploads/206/AFS-8019-11_AirCart_QRC-pdf.php; 2011.

(Continued)

*Primary Examiner* — Thomas G Black
*Assistant Examiner* — Sze-Hon Kong
(74) *Attorney, Agent, or Firm* — Rebecca L. Henkel; Rickard K. DeMille (57) ABSTRACT

In one embodiment, a method includes metering agricultural product to a first header of an agricultural implement via a first meter module of a metering subassembly, receiving, at a processor, a first signal indicative of a first amount of agricultural material at the first header, and determining, via the processor, a first time relative to activation of the first meter module when the first amount reaches a target amount of agricultural product based at least in part on the first signal.

20 Claims, 7 Drawing Sheets

(51) Int. Cl.
- *A01C 7/18* (2006.01)
- *B05B 12/08* (2006.01)
- *A01G 25/16* (2006.01)
- *A01C 7/20* (2006.01)
- *A01C 15/00* (2006.01)
- *A01M 7/00* (2006.01)
- *A01C 7/08* (2006.01)

(52) U.S. Cl.
CPC ......... *A01G 25/165* (2013.01); *A01M 7/0042* (2013.01); *B05B 12/006* (2013.01); *B05B 12/085* (2013.01)

(56) References Cited

U.S. PATENT DOCUMENTS

| | | | |
|---|---|---|---|
| 5,331,907 A | 7/1994 | Beaujot | |
| 5,379,706 A * | 1/1995 | Gage | A01C 15/04 111/174 |
| 5,574,657 A * | 11/1996 | Tofte | A01C 23/007 700/240 |
| 5,884,205 A | 3/1999 | Elmore et al. | |
| 5,911,362 A | 6/1999 | Wood et al. | |
| 5,915,313 A | 6/1999 | Bender et al. | |
| 6,003,455 A * | 12/1999 | Flamme | A01C 15/00 111/200 |
| 6,070,539 A * | 6/2000 | Flamme | A01B 79/005 111/177 |
| 6,091,997 A * | 7/2000 | Flamme | A01B 79/005 111/903 |
| 6,192,813 B1 * | 2/2001 | Memory | A01C 7/081 111/176 |
| 6,253,959 B1 * | 7/2001 | Gaultney | G01G 13/026 222/413 |
| 6,266,595 B1 * | 7/2001 | Greatline | A01B 79/005 340/990 |
| 6,285,938 B1 | 9/2001 | Lang et al. | |
| 6,527,205 B2 | 3/2003 | Andersson et al. | |
| 6,732,667 B1 * | 5/2004 | Wilson | A01C 7/08 111/18 |
| 6,748,884 B1 | 6/2004 | Bettin et al. | |
| 7,104,478 B2 | 9/2006 | Niemela et al. | |
| 7,395,769 B2 | 7/2008 | Jensen | |
| 7,743,719 B2 | 6/2010 | Memory | |
| 8,001,914 B2 | 8/2011 | Peterson et al. | |
| 8,504,310 B2 | 8/2013 | Landphair et al. | |
| 9,119,338 B2 * | 9/2015 | Alsater | A01B 69/007 |
| 9,179,594 B2 * | 11/2015 | Graham | A01C 7/04 |
| 2006/0162630 A1 | 7/2006 | Fuessel et al. | |
| 2010/0116974 A1 | 5/2010 | Liu et al. | |
| 2010/0313801 A1 * | 12/2010 | Peterson | A01C 7/102 111/130 |
| 2011/0035163 A1 | 2/2011 | Landphair et al. | |
| 2011/0184551 A1 * | 7/2011 | Kowalchuk | A01C 7/105 700/219 |
| 2012/0228395 A1 * | 9/2012 | Needham | F16K 31/0606 239/11 |
| 2012/0316736 A1 | 12/2012 | Hubalek et al. | |
| 2013/0061789 A1 * | 3/2013 | Binsirawanich | G01F 1/74 111/107 |
| 2013/0153676 A1 * | 6/2013 | Ballu | A01M 7/0042 239/11 |
| 2013/0333601 A1 * | 12/2013 | Shivak | A01C 7/04 111/118 |
| 2014/0048001 A1 * | 2/2014 | Bassett | A01C 7/205 111/59 |
| 2014/0049395 A1 | 2/2014 | Hui et al. | |
| 2014/0077004 A1 * | 3/2014 | Seki | F02D 41/021 239/533.3 |
| 2014/0263708 A1 * | 9/2014 | Thompson | A01C 23/007 239/11 |
| 2015/0059626 A1 * | 3/2015 | Conrad | A01M 9/0092 111/120 |
| 2015/0115058 A1 * | 4/2015 | Wilger | A01G 25/165 239/61 |
| 2015/0134129 A1 * | 5/2015 | Kidder | A01G 25/16 700/284 |
| 2016/0050842 A1 * | 2/2016 | Sauder | A01C 7/046 111/186 |

OTHER PUBLICATIONS

Fulton, John; Section Control Technology for Sprayers; http://www.aces.edu/anr/precisionag/documents/Section_Control_Technology_Sprayers.pdf; accessed Jan. 28, 2015.

* cited by examiner

SECTIONAL CONTROL CALIBRATION SYSTEM AND METHOD

BACKGROUND

The present application relates generally to agricultural implements, and more specifically, to systems and methods for metering agricultural products.

Generally, agricultural implements (e.g., seeders) are towed behind a tractor or other work vehicle and deliver agricultural products (e.g., seed, fertilizer, and/or other particulate material) to a field. In some cases, agricultural implements may also be coupled to a product storage tank configured to store agricultural products and having a meter configured to regulate a flow of the agricultural products from the product storage tank to the implement. For example, the meter may meter the agricultural products into multiple distribution lines that distribute the agricultural product to corresponding ground engaging tools disposed across a frame of the agricultural implement for deposition of the agricultural product into the soil.

Typical agricultural implements include a single meter or may have multiple meters that are controlled together (e.g., rotate at the same rate or meter the agricultural product from the product storage tank into the multiple distribution lines at the same rate). This may lead to under seeded areas and/or product overlap, which may in turn result in wasted product or reduced overall yield.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In one embodiment, a controller includes a memory and a processor. The processor being configured to access, in the memory, a first time relative to activation of a first meter module of a metering subassembly when a first pressure at a first header of an agricultural implement reaches a first target pressure and to access, in the memory, a second time relative to activation of a second meter module of the metering subassembly when a second pressure at a second header of the agricultural implement reaches a second target pressure. The first and second meter modules are in fluid communication with the first and second headers, respectively. The processor also configured to control a first actuator to activate the first meter module based at least in part on the first time, and to control a second actuator to activate the second meter module based at least in part on the second time.

In a second embodiment, a controller includes a processor configured to instruct a first actuator to drive a first meter module of a metering subassembly to dispense agricultural product to a first header of an agricultural implement, instruct a second actuator to drive a second meter module of the metering subassembly to dispense agricultural product to a second header of the agricultural implement, receive a first signal indicative of a first pressure within the first header and a second signal indicative of a second pressure within the second header, and determine a first time relative to activation of the first meter module when the first pressure reaches a first target pressure based on the first signal and a second time relative to activation of the second meter module when the second pressure reaches a second target pressure based on the second signal.

In a third embodiment, a method includes metering agricultural product to a first header of an agricultural implement via a first meter module of a metering subassembly, receiving, at a processor, a first signal indicative of a first pressure at the first header, and determining, via the processor, a first time relative to activation of the first meter module when the first pressure reaches a target pressure based at least in part on the first signal.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Uniformly controlling meters in agricultural implements with different length distribution lines may result in undesirable application of agricultural product to certain portions of the field, product overlap, and/or inadequate product deposition, which may in turn result in wasted product or reduced overall yield. There exists a need for a sectional control system that is configured to independently control starting and stopping of each meter according to respective calibration times to facilitate appropriate deposition of the agricultural product to the field.

Accordingly, the present disclosure relates to a sectional control system that may be used in an agricultural implement coupled to an air cart and that is configured to calibrate the operation of the meters independently to reduce overlap and/or under seeding of certain areas of a field, such as headlands. Headlands may refer to the borders of a field and are typically seeded first. After the headlands are seeded, operators may traverse the headlands with each pass of the field. Thus, it may be desirable to uniformly stop seeding (e.g., stop deposition of seeds into the soil) when the agricultural implement crosses headlands boundary and uniformly begin seeding (e.g., deposit seeds into the soil) when the implement exits the headlands boundary. However, it should be noted that, while headlands are used as an example area for purposes of discussion, the techniques disclosed herein may be applicable to any area of a field where agricultural product is distributed.

In some embodiments, the meters in the air cart are independently driven and controlled based on times (e.g., calibration times) at which an amount of agricultural product at respective headers reaches a target amount. In some embodiments, the amount of agricultural product is indicated by a measured pressure at the header, air flow rate at the header, or some combination thereof via one or more sensors. The calibration times are related to the time it takes the agricultural product to travel from the meter to its respective header. This may enable deposition of agricultural product into the soil to start and stop at substantially the same time across a width of the agricultural implement and/or to start and stop from each section of ground engaging tools as each respective section crosses a designated boundary. The calibration times may be obtained from a storage medium (e.g., memory) or determined while the air cart and agricultural implement are in use. During operation, a controller may gather information (e.g., weather conditions, or the like) and adjust the calibration times accordingly. According to an aspect of the disclosure, the operation of the meters using the calibrated times may be initiated automatically by location data obtained by a global positioning system (GPS), manually by operator input, or some combination thereof.

In some embodiments, one or more pressure sensors may be located at each header. It should be noted that the calibration techniques disclosed herein may include any number of headers (e.g., 1, 2, 3, 4, 5, 6, etc.). The controller may begin calibration by determining a target pressure for each header. To achieve this, the controller may run each meter and the product flow at each header may be monitored (e.g., via a sensor). When a desired product flow is detected at each header (e.g., by the height of product flow), each pressure sensor may measure the pressure at each header and send a signal indicative of the pressure to the controller, which may set the pressure as the target pressure for each header. It should be noted, that in some embodiments, the target pressure is preset and stored in memory. Then, the controller may calibrate the timing of operation for each meter. To achieve this, the controller may run the meters again and monitor the pressure (e.g., via the pressure sensors) at each header. The controller may record the time (e.g., relative times) at which each header reaches its target pressure. It should be appreciated that it may take longer for the headers on the outside sections (e.g., disposed at a laterally outward position of the implement) of the implement to reach the target pressure due to longer distribution lines than the center sections (e.g., disposed at a laterally inward position of the implement). However, using the relative times at which each header reaches the target pressure, the controller may independently control the meters so that agricultural product is deposited at substantially the same time or cut-off at substantially the same time across the width of the implement and/or as respective sections of the agricultural implement approach and/or cross designated boundaries.

Figure 1:
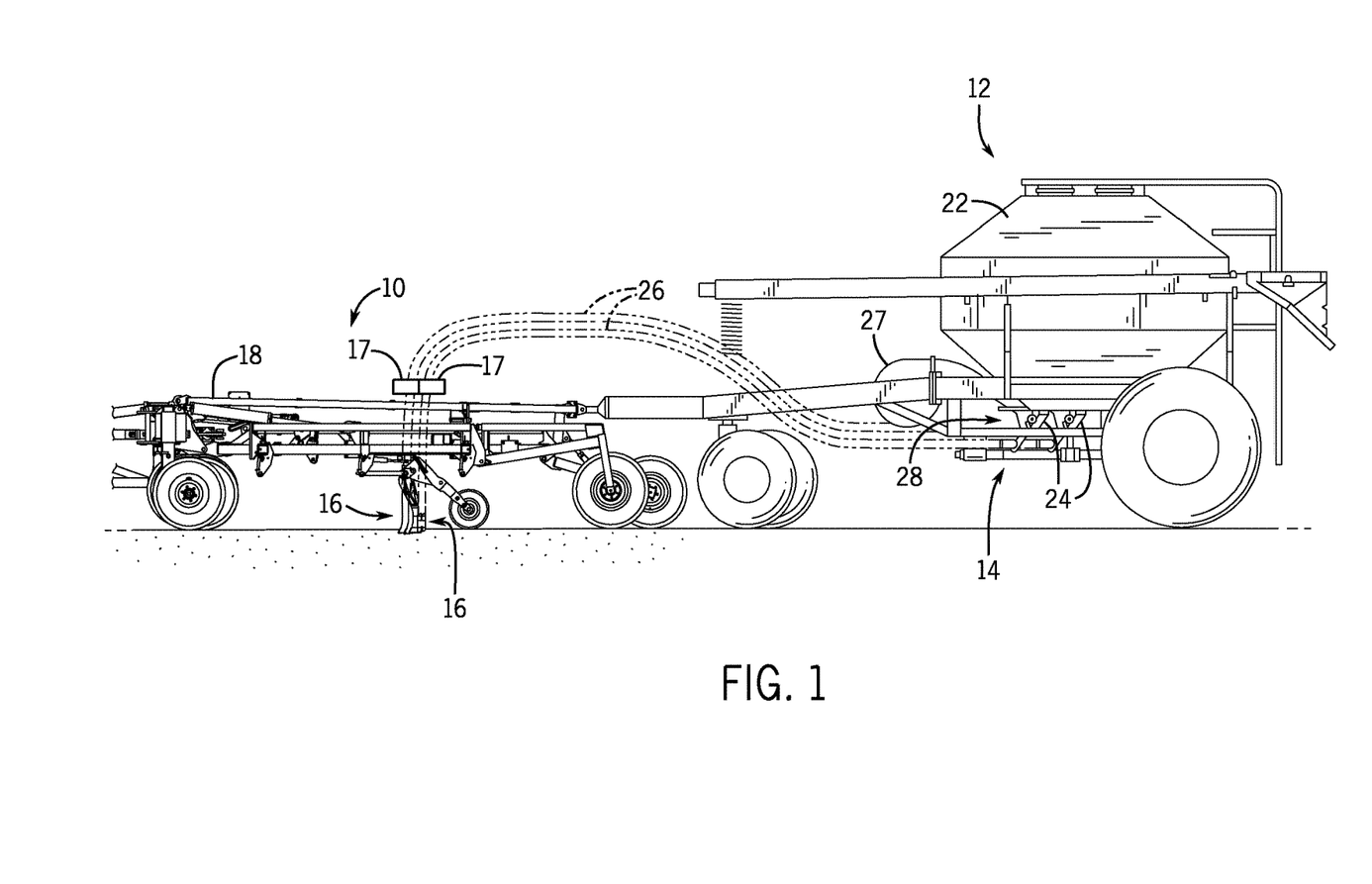
FIG. 1 is a side view of an embodiment of an agricultural implement coupled to an air cart that includes a control system.

With the foregoing in mind, FIG. 1 is a side view of an embodiment of an agricultural implement 10 (e.g., a seeding implement) coupled to an air cart 12 having a control system 14. The implement 10 includes multiple row units 16 and multiple distribution headers 17 supported by a frame 18. Each distribution header 17 is configured to receive agricultural product (e.g., seed, fertilizer, and/or other particulate material) from the air cart 12 and to route the product to each row unit 16. The row units 16 may be configured to deposit the agricultural product into the soil as the implement 10 travels across a field. As shown, the air cart 12 is coupled to the implement 10 via the frame 18. The air cart 12 may include one or more product storage tanks 22 configured to store one or more agricultural products. Each product storage tank 22 is coupled to a corresponding metering subassembly 28, which includes multiple meter modules 24 each coupled to a corresponding primary product distribution line 26 (e.g., primary lines) that is configured to distribute agricultural product to one or more corresponding headers 17 of the implement 10. The meter modules 24 may be in fluid communication with the headers 17. Each meter module 24 may include an actuator and a meter roller, where the actuator may be configured to drive the meter roller to dispense agricultural product from the storage tanks 22. In some embodiments, the meter module 24 may include a gate and the actuator may drive the gate. The meter modules 24 may be controlled by the control system 14. An air source 27 provides an air flow to each of the primary lines 26. The metered agricultural product is entrained within the air flow and pneumatically transferred to the one or more corresponding headers 17 of the implement 10. While two meter modules 24 and two primary lines 26 are shown for clarity, it should be appreciated that, in certain embodiments each metering subassembly 28 may include at least 4, 6, 8, 10, 12, 14, 16, 18, 20, or more meter modules 24 and/or primary lines 26. Furthermore, one metering module 24 may provide the agricultural product to one or more primary lines 26 (e.g., a subset of the primary lines 26). Additionally, while two headers 17 are shown for clarity, it should be appreciated that, in some embodiments the implement 10 may include at least 1, 2, 4, 6, 8, 10, 12, or more headers 17. It should also be appreciated that while two row units 16 are shown for clarity, in certain embodiments, the implement 10 may include at least 4, 6, 8, 10, 12, 14, 16, 18, 20, or more row units 16, and furthermore, that each primary line 26 may provide the agricultural product to any suitable number (e.g., 1, 2, 3, 4, 5, 6, 7, 8, 9, 10, or more) of row units 16. Similarly, while one product storage tank 22 is illustrated, it should be appreciated that, in certain embodiments the air cart 12 may include at least 2, 3, 4, 5, 6 or more product storage tanks 22.

As discussed in more detail below, the control system 14 may be configured to calibrate the activation timing of the meter modules 24 so that headers 17 on the outer sections of the frame 18 receive a suitable amount of product to dispense at substantially the same time as the headers 17 in the center sections of the frame 18. Likewise, the control system 14 may be configured to calibrate the deactivation timing of the meter modules 24 so that all headers 17 cease receiving and distributing product at substantially the same time. In some embodiments, the calibration times may enable the control system 14 to independently control the meter modules 24 such that the product is distributed to the field according to a designated boundary. The control system 14 may be configured to receive inputs from a pressure sensor and determine the relative times at which each header reaches a target pressure. That is, the times may be relative to the activation of the meter modules 24. The control system 14 may independently operate the meter modules 24 based on the relative times. Also, the control system 14 may adjust the times during operation of the agricultural implement if conditions change or upon demand. In some embodiments, the control system 14 may activate or deactivate the meter modules 24 based on location data provided by the GPS or based on operator input.

Figure 2:
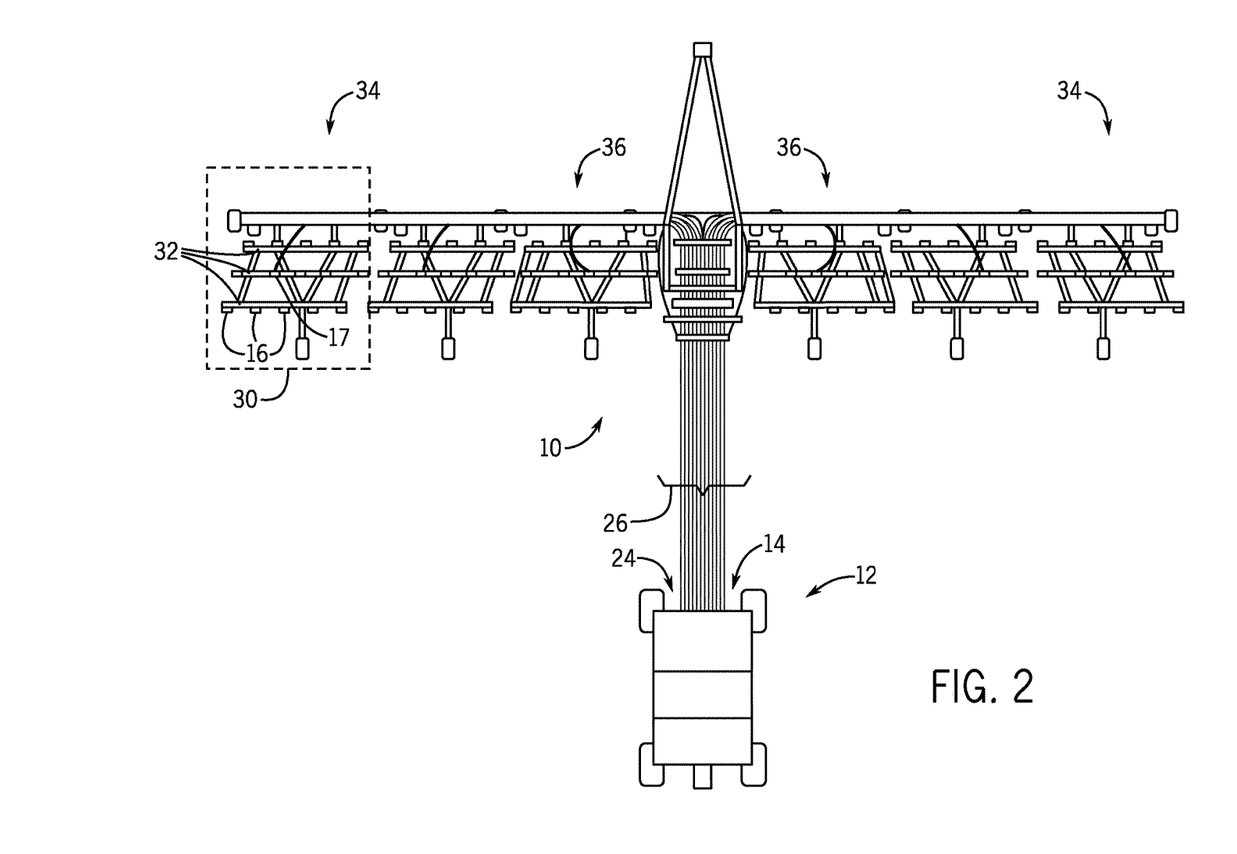
FIG. 2 is a top view of an embodiment of the agricultural implement and the air cart of FIG. 1.

FIG. 2 illustrates a top view of the agricultural implement 10 coupled to the air cart 12 of FIG. 1. As depicted, the implement 10 includes six sections 30 attached to the frame 18 of the implement 10. Each section 30 includes multiple row units 16 attached to crossbars 32. Laterally displacing the row units 16 in the illustrated manner may enable a dense disbursement of product across a wide swath of soil. In addition, each section 30 may include one header 17 that receives agricultural product metered by a respective meter module 24 into a respective attached primary line 26. As such, there may be six meter modules 24 and six primary lines 26 in the depicted embodiment, one for each header 17. The headers 17 may route the product to the respective multiple row units 16 to distribute the product to the ground. In some embodiments, each section 30 may include any number of suitable headers 17 and/or row units 16. The sections 30 may have any suitable configuration.

It should be appreciated that the elapsed time for product to reach the outer sections 34 on the frame 18 may be longer than the inner sections 36 near the center of the frame 18. Thus, the control system 14 may calibrate the timing of activating and deactivating the meter modules 24, as described in detail below, to reduce overlap of product or under seeding areas of a field, such as headlands. To achieve this, each header 17 may include one or more sensors, such as a pressure sensor, air flow sensor, and the like. During calibration, the pressure sensor may detect the pressure at the header 17 and send the data to the control system 14. When the pressure at each header 17 reaches a target pressure, the control system 14 may record the elapsed time and control the meter modules 24 according to the respective relative elapsed times.

Figure 3:
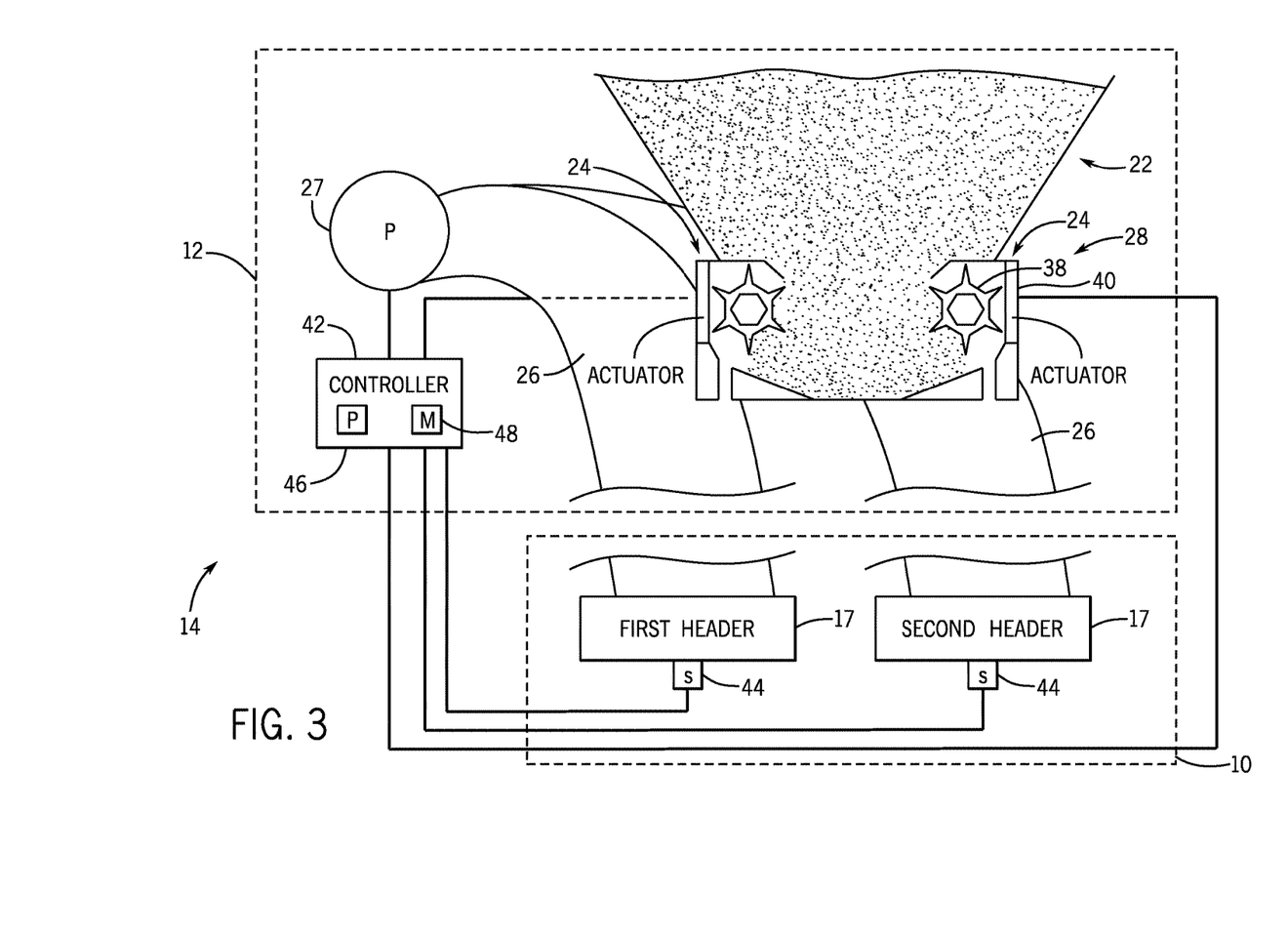
FIG. 3 is a schematic diagram of a portion of an embodiment of the implement and the air cart of FIG. 1.

FIG. 3 is a schematic diagram of a portion of an embodiment of the implement 10 and the air cart 12. To facilitate discussion, one product storage tank 22 and its corresponding metering subassembly 28 is shown. However, it should be understood that the air cart 12 may include any suitable number of storage tanks 22, and the control system 14 may provide one metering subassembly 28 for each storage tank 22. As shown, the metering subassembly 28 includes two meter modules 24 (e.g., a first metering module and a second metering module), although the metering subassembly 28 may include any suitable number of meter modules 24, as noted above. In the illustrated embodiment, each meter module 24 is configured to meter the agricultural product into a corresponding primary line 26. The air source 27 may move air past the meter module 24 in each primary line 26 to the header 17. The air source 27 may include a fan, pump, or blower powered by an electric or hydraulic motor. As the meter module 24 dispenses product into the air flow in each primary line 26, each primary line 26 is configured to direct the agricultural product to a corresponding distribution header 17 of the implement 10, and the distribution header 17 is configured to distribute the agricultural product into one or more corresponding secondary lines extending to a corresponding row unit 16. As depicted, two headers 17 are shown (e.g., a first header and a second header), each header 17 being connected to a separate primary line 26 and metering module 24. It should be noted that any suitable number of headers 17 may be used. Each meter module 24 and corresponding primary line 26 may thus provide agricultural product to separate sections 30 of the implement 10, as noted above. Because each meter module 24 may be separately controlled, the product may be disbursed into longer primary lines 26 that deliver the product to headers 17 on the outside of the implement 10 before metering product to the shorter primary lines 26 that deliver product to headers 17 at the center portions of the implement, in some embodiments. Also, meter modules 24 connected to longer primary lines 26 may be deactivated prior to meter modules 24 connected to shorter primary lines so that the cut-off of product delivery to ground may be substantially concurrently, in some embodiments.

Each meter module 24 includes a meter roller 38 (e.g., meter) and an actuator 40 (e.g., motor) configured to actuate (e.g., drive rotation of) the respective meter 38. That is, each motor 40 may drive rotation of a drive shaft coupled to the respective meter 38. Although each meter module 24 includes the motor 40 in the illustrated embodiment, the respective meter roller 38 of each metering module 24 may be driven into rotation via any suitable mechanism. The control system 14 also includes a controller 42 that may be coupled to each meter subassembly 28. The controller 42 is configured to control each motor 40 based on the calibration times and/or one or more factors, such as location of the agricultural implement, speed of the agricultural implement, weather, and the like. In certain embodiments, the controller 42 is an electronic controller having electrical circuitry configured to process signals (e.g., signals indicative of pressure at each header 17, weather conditions, speed, location) from one or more sensors 44 (e.g., pressure, speed, weather condition, GPS). In some embodiments, a pressure sensor 44 may be located at each header 17 and configured to measure the pressure at the header 17 and transmit the pressure to the controller 42. For example, as illustrated, the pressure sensors 44 may be located at the bottom of the headers 17. The controller 42 may also be communicatively coupled to the air source 27 to control the air flow.

In the illustrated embodiment, the controller 42 includes a processor 46, such as a microprocessor, and a memory device 48. The controller 42 may also include one or more storage devices and/or other suitable components. The processor 46 may be used to execute software, such as software for controlling the control system 14. Moreover, the processor 46 may include multiple microprocessors, one or more "general-purpose" microprocessors, one or more special-purpose microprocessors, and/or one or more application specific integrated circuits (ASICS), or some combination thereof. For example, the processor 46 may include one or more reduced instruction set (RISC) or complex instruction set (CISC) processors.

The memory device 48 may include a volatile memory, such as random access memory (RAM), and/or a nonvolatile memory, such as ROM. The memory device 48 may store a variety of information and may be used for various purposes. For example, the memory device 48 may store processor-executable instructions (e.g., firmware or software) for the processor 46 to execute, such as instructions for controlling the control system 14. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., calibration times of the meters data, target pressures at each header data, location data, implement speed data, weather condition data, agricultural product type data, or the like), instructions (e.g., software or firmware for controlling the control system 14, or the like), and any other suitable data.

Figure 4:
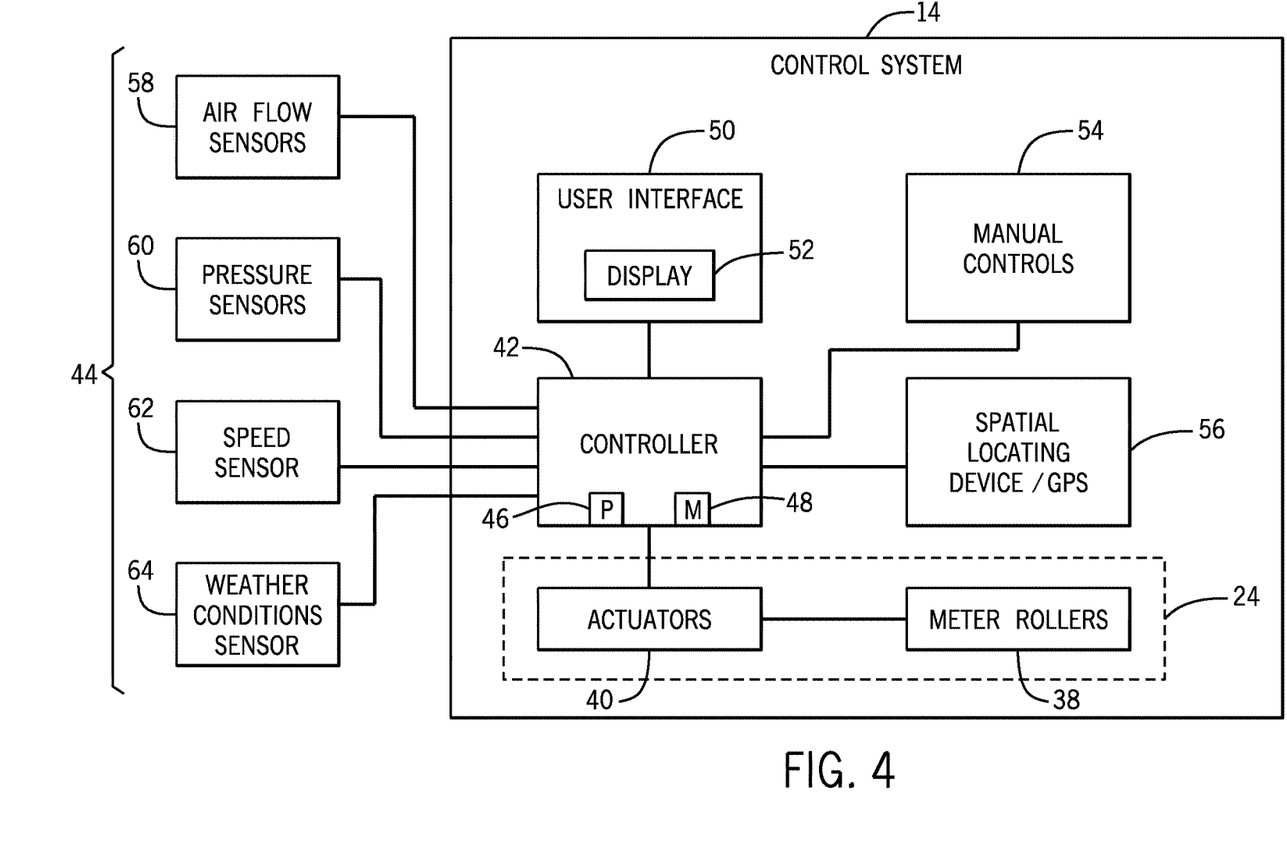
FIG. 4 is a block diagram of an embodiment of the control system of FIG. 1.

FIG. 4 is a block diagram of an embodiment of the control system 14. As illustrated, the control system 14 includes a user interface 50 including a display 52, manual controls 54, the controller 42 including the processor 46 and the memory device 48, the meter modules 24 including the actuators 40 and the meter rollers 38, and a spatial locating device/GPS 56. In the illustrated embodiment, the user interface 50 may be communicatively coupled to the controller 42. The user interface 50 may be configured to accept operator input, such as selecting or inputting a type of agricultural product to dispense, a terrain type to work, and so forth. The user interface 50 may also enable an operator to request the control system 14 to recalibrate at any time the operator determines that recalibration is desirable. In certain embodiments, the user interface includes the display 52 configured to present information to the operator, such as whether the control system 14 is activating or deactivating meter modules 24, a geographic location of the implement 10 and air cart 12, a speed of the implement 10 and air cart 12, weather conditions, among other things.

As illustrated, the control system 14 includes manual controls 54 configured to enable an operator to control the control system 14 at any time during operation. The manual controls 54 may enable the operator to manually instruct the control system 14 to operate the meter modules 24 at any desired area in a field. For example, if the implement 10 is approaching a certain boundary, such as a headland, the operator may manually initiate disbursement of agricultural product, and the control system 14 may use the calibration times information to independently operate the meter modules 24 accordingly. In some instances, the meter modules 24 that supply agricultural product to the outside headers 17 of the implement may be activated first (e.g., based on a first calibration time) and then the meter modules 24 that supply product to the center headers 17 may be activated (e.g., based on a second calibration time). Similarly, if the operator manually deactivates the disbursement, the control system 14 may deactivate the meter modules 24 that supply product to the outside headers 17 of the implement since the product will take longer to reach the headers 17 than the center headers 17 with shorter primary lines 26. In addition, the manual controls 54 may include manual steering control, manual transmission control, and/or manual braking control, among other controls. In the illustrated embodiment, the manual controls 54 are communicatively coupled to the controller 42.

In the illustrated embodiment, the control system 14 may include a spatial locating device/GPS 56 (e.g., GPS). The GPS 56 may be configured to determine the location and position of the implement 10 and the air cart 12. In certain embodiments, the GPS 56 may be configured to determine the location and position of the implement 10 and the air cart 12 relative to a fixed point within a field (e.g., via a fixed radio transceiver). Accordingly, the GPS 56 may be configured to determine the location and position of the implement 10 and the air cart 12 relative to a fixed global coordinate system or a fixed local coordinate system. As illustrated, the GPS 56 is communicatively coupled to the controller 42. The location and position information provided by the GPS 56 to the controller 42 may be used by the processor 46 to determine when to activate and/or deactivate the meter modules 24 based on the calibration times information. For example, if the data from the GPS 56 indicates that the implement 10 is about to exit a headlands section, the controller 42 may activate the meter modules 24 coupled to the headers 17 that take longer to reach the target pressure first (e.g., the laterally outer headers 17) and then activate the meter modules 24 coupled to the headers 17 that take less time to reach the target pressure (e.g., the laterally inner headers 17) based on respective calibration times. In this way, the headers 17 across the width of the implement 10 output the product to the ground as the implement crosses the boundary of the headlands, for example. The GPS 56 may also provide information indicating areas of the field that have already been seeded to enable the control system 14 to automatically shut off the meter modules 24 using the calibration times to block overlapping of product. It should be appreciated, that the process of controlling the meter modules 24 with the control system 24 may occur automatically based on location and position information received from the GPS 56. Alternatively, as noted above, the process may be initiated or turned off manually at any time by the operator.

The controller 42 may be configured to receive signals from the communicatively coupled sensors 44. The sensors 44 may include one or more air flow sensors 58, pressure sensors 60, speed sensors 62, weather conditions sensors 64, and the like. The air flow sensors 58 may be located at the headers 17, at the air source 27, or at any suitable position along the air flow path in the primary lines 26. The air flow sensors 58 may be configured to measure the amount of air flow and transmit a signal indicative of the air flow level to the controller 42. As previously mentioned, one or more pressure sensors 60 may be located at each header 17 in any suitable place to measure pressure, such as at the bottom of the header 17. The pressure sensors 60 may measure the amount of pressure at each header 17 and transmit a signal indicating such to the controller 42. In some embodiments, as described in detail below, the pressure measured at the time when product flow is at a desired flow may be set as a target pressure for a particular header 17 by the controller 42. The controller 42 may time how long it takes for each header 17 to reach its respective target pressure and use that timing information to independently control the meter modules 24 as desired.

In the illustrated embodiment, the speed sensors 62 may be configured to measure the speed of the implement 10 and/or the air cart 12. The speed may be used by the controller 42 to determine when to activate and/or deactivate the meter modules 24 (e.g., based on when the sections 30 will cross the designated boundary). In some embodiments, the speed of the implement 10 and the air cart 12 may influence the amount of agricultural product to dispense, which may affect the rotational speed of the meter rollers 38, the air flow output by the air source 27, and so forth. For example, more agricultural product may be dispensed when the implement 10 is traveling at higher speeds than lower speeds to ensure that sufficient product reaches the ground. Thus, in some embodiments, the speed of the implement 10 and/or the air cart 12 may be used by the controller 42 to activate or deactivate and/or to control the metering rate of the meter modules 24.

As illustrated, the weather condition sensors 64 may also send signals to the controller 42. The weather conditions measured by sensors 64 may include the temperature, humidity level, precipitation, and so forth. The weather conditions may affect the agricultural product and the efficiency with which the product flows through the primary lines 26, for example, and thus may affect how the controller 42 controls the distribution of the product. For example, humidity may cause the agricultural product to clump or stick together and, as a result, air flow may need to be increased to attain a sufficient amount of product distribution and/or the calibration times may need to be adjusted to account for the weather conditions. Thus, in some embodiments, the controller 42 may accept the weather condition as an input when determining the calibration times of the meter modules 24.

Figure 5:
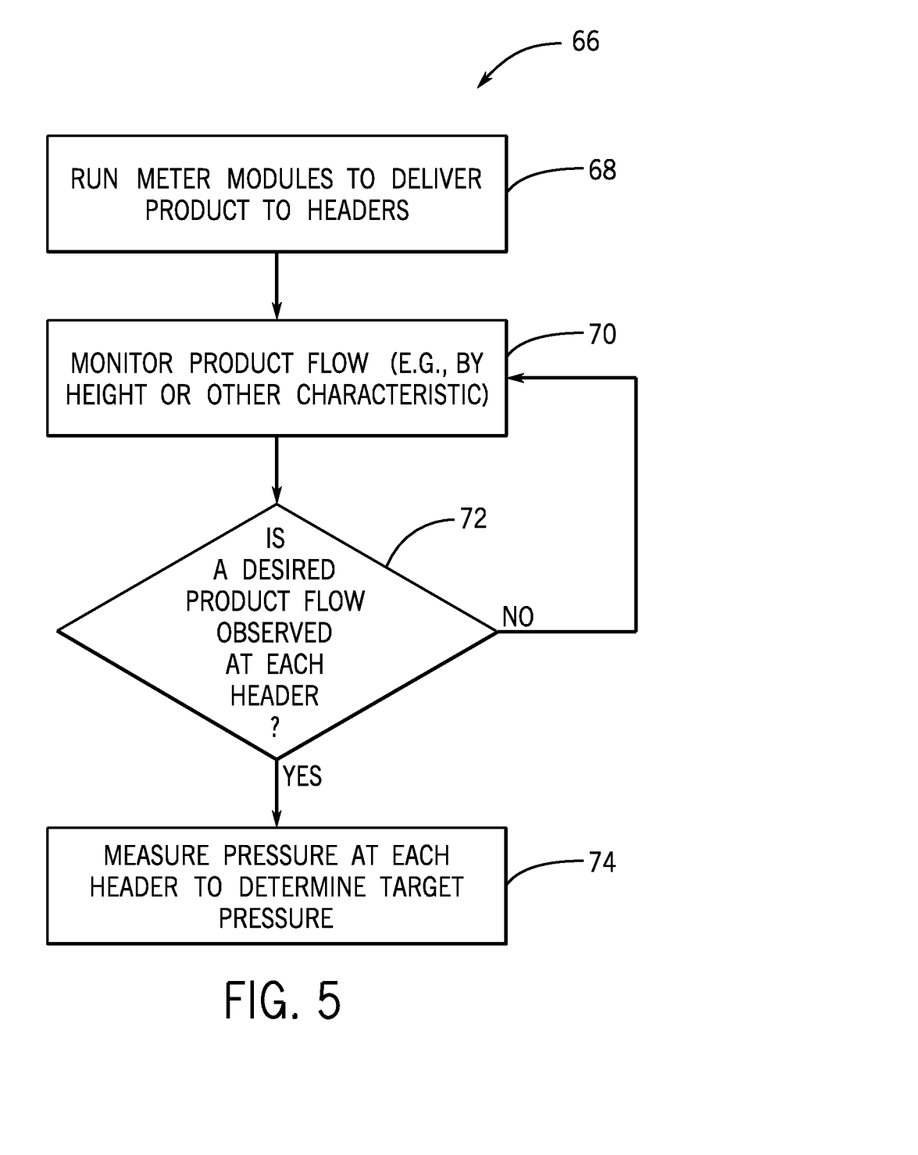
FIG. 5 is a flow diagram of an embodiment of a process suitable for calibrating a target pressure at each header of the agricultural implement of FIG. 1.

FIG. 5 is a flow diagram of an embodiment of a process 66 suitable for calibrating a target pressure at each header 17 of the implement 10. Portions of the process 66 may be implemented as processor-executable instructions stored on the memory device 48. The process 66 may include running the meter modules 24 to deliver agricultural product to each header 17 (process block 68), monitoring the product flow (e.g., by height of emitted product or other characteristic) (process block 70), determining whether a desired product flow is observed at each header 17 (decision block 72), and, if so, measuring the pressure at each header 17 to determine a target pressure (process block 74), or, if not, continuing to monitor the product flow (process block 70). In some embodiments, the target pressure calibration process 66 may be performed the first time the implement 10 is operational, such as the first trip across the field, or at any desirable time. It should be noted that in some embodiments, the target pressure at each header 17 is preset and stored in the memory device 48.

Starting with process block 68, the controller 42 may instruct the meter modules 24 to dispense product into the primary lines 26 to be delivered via the air flow from the air source 27 to the headers 17. The controller 42 may instruct the air source 27 to increase or decrease the air flow as desired until a sufficient product flow is obtained. Thus, the process 66 may include monitoring the product flow at each header 17 (process block 70). In some embodiments, the product flow may be observed by the operator or measured via a sensor, such as an optical, contact, or flow sensor from each header 17. In decision block 72, when the operator observes or sensor detects product flowing from each header 17 at a desired height, such as 4", 5", 6", a foot, and so forth, the control system 14 may measure the pressure at each header 17 by obtaining a reading from the pressure sensors 60. It should be understood that the pressure at each header 17 may be consistent with one another or the pressure may vary based on whether it is desirable to have certain headers 17 dispense more or less product than other headers 17. The controller 42 may set the measured pressure as the target pressure for each of the headers 17 (process block 74). Also, in some embodiments, a threshold range of target pressures may be determined that includes the measured pressure within the range and any one of the target pressures within the range may be suitable for each header 17 during operation.

Figure 6:
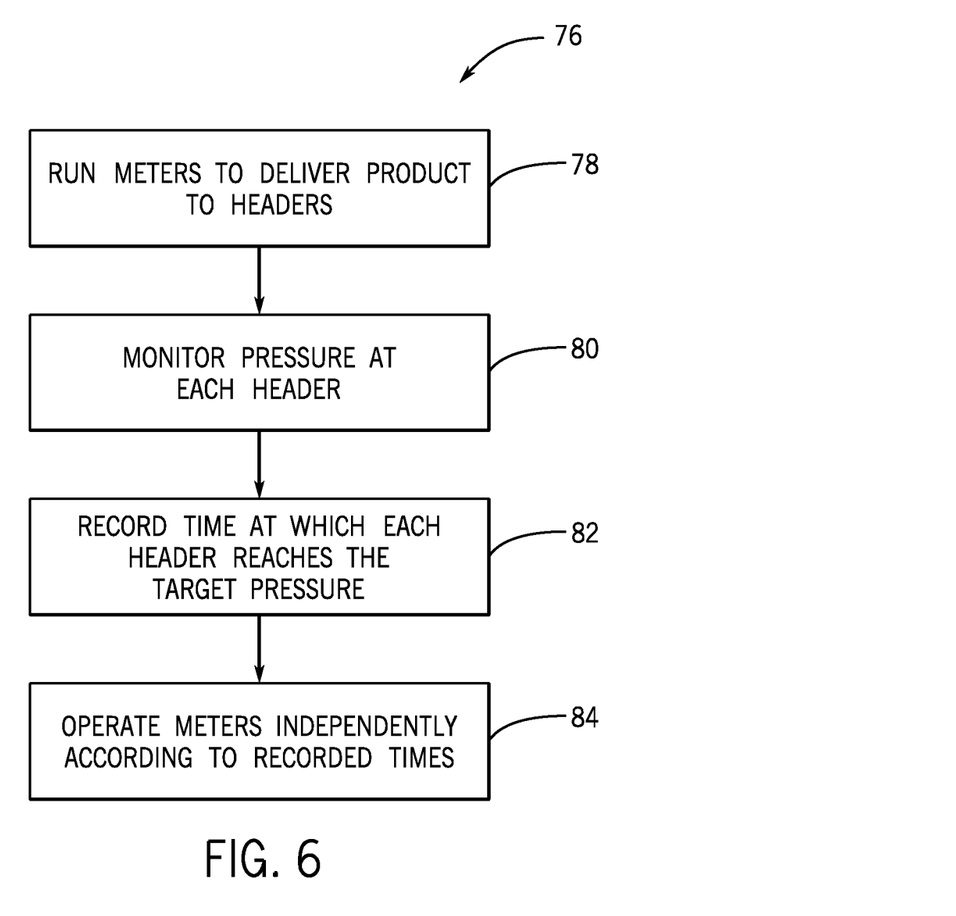
FIG. 6 is a flow diagram of an embodiment of a process suitable for calibrating a time at which the pressure at each header reaches the target pressure.

FIG. 6 is a flow diagram of an embodiment of a process 76 suitable for calibrating a time at which the pressure at each header 17 reaches its target pressure. It should be noted that the timing calibration process 76 may use the target pressures for each header 17 as determined in process 66 or may use target pressures that are preset and stored in the memory device 48. The process 76 may be implemented as processor-executable instructions stored on the memory device 48. As previously noted, the process 76 for establishing calibration times for each meter module 24 may be performed at any desirable time, such as when the implement 10 and air cart 12 first become operational during the first trip across the field. Also, the process 76 may be initiated automatically or by operator input. In some embodiments, the process 76 may include running the meter modules 24 to deliver product to headers 17 (controlling the actuators in the meter modules 24) (process block 78), monitoring the pressure at each header 17 (process block 80), recording the time (e.g., relative time) at which each header 17 reaches the target pressure (process block 82), and operating meter modules 24 independently according to the respective recorded times (process block 84). In an embodiment, the process 76 may be repeated for turning off the meter modules 24. For example, the controller 42 may turn off the meter modules 24, monitor the pressure at each header 17, and record the time (e.g., relative time) at which each header reaches zero pressure. The determined delay time may be used by the controller 42 to independently operate the meter modules 24 accordingly.

Starting with process block 78, the controller 42 may instruct the meter modules 24 to dispense product into the primary lines 26 to be delivered via the air flow to the headers 17. In some embodiments, the controller 42 may instruct the air source 27 to output air, and the meter module 24 to distribute product, at the same rate that the desired product flow was obtained. The controller 42 may monitor the pressure at each header 17 (process block 80) by continuously or periodically receiving signals indicative of pressure from the one or more pressure sensors 60 at each header 17. The controller 42 may record the elapsed time it takes (e.g., the calibration times) each header 17 to reach the target pressure in the memory device 48 for later use (process block 82). The controller 42 may determine the calibration time for each header 17 and, as the implement 10 and air cart 12 traverse the field, the controller 42 may operate the meter modules 24 independently according to the recorded calibration times.

To illustrate how the calibration times may be used by the controller 42, by way of example, it may take the headers 17 in the outside sections 30 of the frame 18 ten seconds to reach the target pressure and it may take the headers 17 in the center sections 30 of the frame 18 five seconds to reach the target pressure. When the controller 42 determines the implement 10 is nearing a boundary where seeding is to be activated based on GPS data, for example, the controller 42 may instruct the meter modules 24 that supply product to the headers 17 in the outside sections 30 to distribute product to the headers 17 when the implement 10 is ten seconds away from the boundary (accounting for speed, weather, and the like). Then, when the implement 10 is five seconds away from the boundary, the controller 42 may instruct the meter modules 24 that supply product to the headers 17 in the center sections 30 to distribute product to the headers 17. Accordingly, the headers 17 in the outside sections 30 and the center sections 30 of the frame 18 may reach the target pressures at substantially the same time so a uniform deposition of product to the soil is attained when the implement 10 crosses the boundary.

Figure 7:
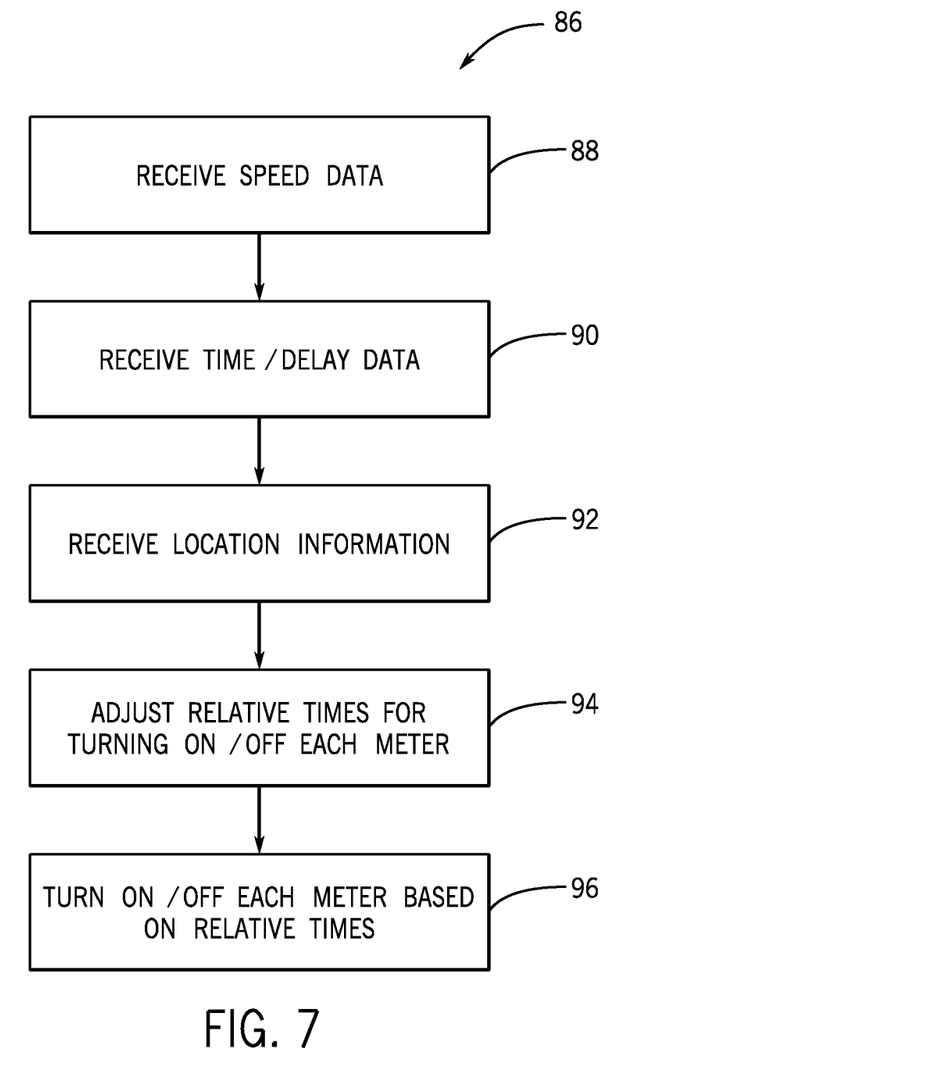
FIG. 7 is a flow diagram of an embodiment of a process suitable for operating meters independently according to calibrated times.

FIG. 7 is a flow diagram of an embodiment of a process 86 for operating the meter modules 24 independently according to calibration times. The process 86 may be implemented as processor-executable instructions stored on the memory device 48. The process 86 may be performed automatically by the control system 14 as the implement 10 and air cart 12 traverse the field. In some embodiments, the process 86 may be initiated by operator input. The process 86 may include receiving speed data (process block 88), receiving calibration time data (process block 90), receiving location information (process block 92), adjusting calibration times for activating/deactivating each meter module 24 (process block 94), and activating/deactivating each meter module 24 based on the adjusted calibration times (process block 96).

Beginning with process block 88, as previously noted, the controller 42 may receive speed data from a speed sensor 62 that measures the speed of the implement 10 and/or the air cart 12. The speed of the implement 10 and the air cart 12 may affect the density of product that is distributed by the implement 10. Also, the speed may be considered by the controller 42 when determining when to activate/deactivate the meter modules 24 based on the calibration times. In process block 90, the controller 42 may receive the calibration time data related to how long it takes each header 17 to reach the target pressure when the respective meter module 24 is activated or deactivated. For example, the calibration time data may include a first calibration time at which a first header reaches the target pressure, a second calibration time at which a second header reaches the target pressure, and so forth. The calibration time data may be dynamically calibrated as discussed above regarding process 76, or, in some embodiments, the calibration time data may accessed in the memory device 48 as preset timing information or from previous calibrations. In process block 92, the controller 42 may receive information related to the location of the implement 10 from the GPS 56. The location data may be used by the controller 42 in conjunction with the calibration times to determine when to activate/deactivate the meter modules 24. For example, the location information may indicate that a boundary is approaching where seeding should be turned on or off. In some embodiments, the location information may indicate portions of a field that have already been seeded and the control system 14 may refrain from seeding those areas again or the operator may cease operation of seeding in an area that is already seeded. Thus, as may be appreciated, some inputs received by the controller 42 may include the speed data, the calibration time data, and the location information. As previously noted, other inputs may be considered by the controller 42, such as the humidity level, air flow, and the like.

Accounting for certain inputs, such as the humidity level, air flow, product type, and the like, in process block 94, the controller 42 may adjust the calibration times for turning on/off each meter module 24. Then, in process block 96, the controller 42 may turn on/off each meter module 24 based on the calibration times or adjusted calibration times set by the controller 42. The process 86 may provide uniform distribution of product from each header 17 at substantially the same time regardless of primary line 26 length, uniform cessation of product distribution from each header 17 at substantially the same time, or both. Furthermore, the process 86 may enable precise product deposition into the soil according to designated boundaries (e.g., headland boundaries or other designated boundaries defining regions of the field, preseeded regions, or the like).

While only certain features of the subject matter have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A controller, comprising:
a memory; and
a processor configured to:
   access, in the memory, a first elapsed time relative to activation of a first meter module of a metering subassembly when a first pressure within a first header of an agricultural implement reaches a first target pressure;
   access, in the memory, a second elapsed time relative to activation of a second meter module of the metering subassembly when a second pressure within a second header of the agricultural implement reaches a second target pressure, wherein the first pressure is measured via a first pressure sensor at the first header, the second pressure is measured via a second pressure sensor at the second header, and the first and second meter modules are in fluid communication with the first and second headers, respectively;
   control a first actuator to activate the first meter module to enable product flow from a product storage tank through the first elapsed header based at least in part on the first time; and
   control a second actuator to activate the second meter module to enable product flow from the product storage tank through the second elapsed header based at least in part on the second time.

2. The controller of claim 1, wherein the processor is configured to adjust the first and second elapsed times based on weather conditions, product type, or both.

3. The controller of claim 1, wherein the first target pressure comprises a range of target pressures.

4. The controller of claim 1, wherein the processor is configured to determine the first elapsed time and the second elapsed time, by:
controlling the first and second actuators;
measuring the first and second pressures via respective signals received from the first pressure sensor at the first header and the second pressure sensor at the second header;
recording, in the memory, the first elapsed time at which the first header reaches the first target pressure; and
recording, in the memory, the second elapsed time at which the second header reaches the second target pressure.

5. The controller of claim 4, wherein the processor is configured to determine the first target pressure by:
controlling the first actuator;
measuring product flow at the first header via a flow sensor;
measuring the first pressure within the first header when the product flow reaches a desired product flow; and
setting the first target pressure equal to the first pressure.

6. The controller of claim 5, wherein the desired product flow is reached when a height of the product ejected from the first header meets a threshold level.

7. The controller of claim 5, wherein the flow sensor is an optical or contact sensor.

8. The controller of claim 1, wherein the processor is configured to control the first actuator and the second actuator based at least in part on global positioning system (GPS) signals indicative of a location of the agricultural implement.

9. The controller of claim 1, wherein controlling the first actuator to activate the first meter module based at least in part on the first elapsed time and controlling the second actuator to activate the second meter module based at least in part on the second elapsed time causes the first header and the second header to initiate delivery of agricultural product to respective ground engaging tools substantially concurrently.

10. The controller of claim 1, wherein controlling the first actuator to activate the first meter module based at least in part on the first elapsed time and controlling the second actuator to activate the second meter module based at least in part on the second elapsed time causes the first header to initiate delivery of agricultural product to a field via a first group of corresponding ground engaging tools as the first group of corresponding ground engaging tools cross a designated boundary of the field and the second header to initiate delivery of agricultural product to the field via a second group of corresponding ground engaging tools as the second group of corresponding ground engaging tools cross the designated boundary of the field.

11. A controller, comprising:
a processor configured to:
instruct a first actuator to drive a first meter module of a metering subassembly to dispense agricultural product from a product storage tank to a first header of an agricultural implement;
instruct a second actuator to drive a second meter module of the metering subassembly to dispense agricultural product from the product storage tank to a second header of the agricultural implement;
receive a first signal indicative of a first pressure within the first header from a first pressure sensor at the first header and a second signal indicative of a second pressure within the second header from a second pressure sensor at the second header; and
determine a first elapsed time relative to activation of the first meter module when the first pressure reaches a first target pressure based on the first signal and a second elapsed time relative to activation of the second meter module when the second pressure reaches a second target pressure based on the second signal.

12. The controller of claim 11, wherein the first target pressure and the second target pressure are substantially equal.

13. The controller of claim 11, wherein the controller is configured to determine the first target pressure and the second target pressure by:
controlling the first actuator and the second actuator;
measuring product flow at the first header and the second header via respective flow sensors;
measuring the first pressure within the first header via the first pressure sensor and the second pressure within the second header via the second pressure sensor when the product flow reaches a desired product flow; and
setting the first target pressure equal to the first pressure within the first header and setting the second target pressure equal to the second pressure within the second header.

14. The controller of claim 11, comprising a memory, wherein the first target pressure and the second target pressure are stored in the memory and accessed by the processor.

15. The controller of claim 11, wherein the processor is configured to instruct the first actuator to activate the first meter module independently based at least in part on the first elapsed time and to instruct the second actuator to activate the second meter module independently based at least in part on the second elapsed time to cause the first header and the second header to initiate delivery of the agricultural product to a field substantially concurrently.

16. A method comprising:
metering agricultural product from a product storage tank to a first header of an agricultural implement via a first meter module of a metering subassembly;
receiving, at a processor, a first signal indicative of a first amount of agricultural material at the first header from a first sensor at the first header; and
determining, via the processor, a first elapsed time relative to activation of the first meter module when the first amount reaches a target amount of agricultural product based at least in part on the first signal.

17. The method of claim 16, wherein the first sensor is configured to measure a first pressure at the first header.

18. The method of claim 16, comprising instructing actuators to activate the first meter module based at least in part on the first elapsed time to cause the first header to initiate delivery of the agricultural product to a field.

19. The method of claim 18, comprising receiving, at the processor, signals related to a location of the agricultural implement via a global positioning system (GPS), and instructing actuators to activate the first meter module based at least in part on the first elapsed time and the signals to cause the first header to initiate delivery of agricultural product to a field via a first group of corresponding ground engaging tools as the first group of corresponding ground engaging tools cross a designated boundary of the field.

20. The method of claim 16, comprising metering agricultural product to a second header of the agricultural implement via a second meter module of the metering subassembly;
receiving, at the processor, a second signal indicative of a second amount of agricultural material at the second header from a second sensor at second header; and
determining, via the processor, a second elapsed time relative to activation of the second meter module when the second amount reaches the target amount based at least in part on the second signal.

* * * * *